(12) United States Patent
Sharif et al.

(10) Patent No.: US 10,271,202 B2
(45) Date of Patent: Apr. 23, 2019

(54) DOCUMENT SIGNING PLATFORM CAPABLE OF CAPTURING SUBSTANTIATING EVENT DATA

(71) Applicant: Zava Global Partners LLC, Scottsdale, AZ (US)

(72) Inventors: Faizaan Sharif, Scottsdale, AZ (US); Zachary L. Lovelady, Albuquerque, NM (US)

(73) Assignee: Zava Global Partners LLC, Scottsdale, AZ (US)

( * ) Notice: Subject to any disclaimer, the term of this patent is extended or adjusted under 35 U.S.C. 154(b) by 0 days.

(21) Appl. No.: 15/816,266

(22) Filed: Nov. 17, 2017

(65) Prior Publication Data
US 2018/0077565 A1 Mar. 15, 2018

Related U.S. Application Data

(63) Continuation of application No. 14/999,444, filed on May 5, 2016, now Pat. No. 9,854,430.
(60) Provisional application No. 62/389,570, filed on Mar. 2, 2016, provisional application No. 62/179,479, filed on May 8, 2015.

(51) Int. Cl.
*H04W 8/20* (2009.01)
*H04W 12/12* (2009.01)
(Continued)

(52) U.S. Cl.
CPC ....... *H04W 8/205* (2013.01); *H04M 1/72547* (2013.01); *H04W 4/02* (2013.01);
(Continued)

(58) Field of Classification Search
CPC ............. H04L 9/3247; H04L 2463/082; H04L 63/0823; H04L 63/12; G06F 17/30525;
(Continued)

(56) References Cited

U.S. PATENT DOCUMENTS 6,067,531 A    5/2000  Hoyt et al.
7,051,364 B1   5/2006  Tackman et al.
(Continued)

OTHER PUBLICATIONS

Item-Level Auditing with SharePoint Server 2007 by Pattison et al., dated Oct. 16, 2013 (Retrieved from https://msdn.microsoft.com/ru-ru/library/bb397403(v=office.12).aspx).*
(Continued)

*Primary Examiner* — Daniel Lai
(74) *Attorney, Agent, or Firm* — Knobbe, Martens, Olson & Bear, LLP

(57) ABSTRACT

A document signing platform implemented on one or more computers implements a process for capturing data evidencing valid execution of a document. The process comprises: receiving, from an originator computing device, a submission comprising a document to be signed by a signatory; providing the signatory electronic access to the document and to an indication of a set of one or more substantiation actions to be performed; and receiving and recording event data from a signatory device associated with the signatory. The event data includes data associated with affixation of an electronic signature to the document, and additionally includes substantiation event data representing performance of the set of one or more substantiation actions on the signatory device. The process further comprises validating completion of the set of substantiation actions based on the received event data; and generating a certificate of evidence that comprises at least some of the event data.

16 Claims, 9 Drawing Sheets

(51) Int. Cl.
*H04W 4/02* (2018.01)
*H04M 1/725* (2006.01)
*H04W 12/06* (2009.01)
*H04W 84/04* (2009.01)
*H04W 84/12* (2009.01)
*G06F 21/10* (2013.01)
*H04L 29/06* (2006.01)

(52) U.S. Cl.
CPC ........... *H04W 12/06* (2013.01); *H04W 12/12* (2013.01); *G06F 21/10* (2013.01); *H04L 63/0823* (2013.01); *H04L 63/0861* (2013.01); *H04M 2250/64* (2013.01); *H04M 2250/68* (2013.01); *H04W 84/042* (2013.01); *H04W 84/12* (2013.01)

(58) Field of Classification Search
CPC .... G06F 21/10; G06F 17/30; G06F 17/30011; G06Q 50/18; G06Q 20/3825; G06Q 20/4014; G06Q 30/06; G06Q 10/103; G06Q 40/08; G06Q 10/101; H04W 8/205; H04W 12/12; H04W 4/02; H04W 84/042; H04W 84/12; H04M 1/72547; H04M 2250/68; H04M 2250/64
See application file for complete search history.

(56) References Cited

U.S. PATENT DOCUMENTS

| | | |
|---|---|---|
| 7,146,343 B2 | 12/2006 | Donahue |
| 7,363,509 B2 | 4/2008 | Farquharson et al. |
| 8,190,904 B2 | 5/2012 | Hatter et al. |
| 8,307,218 B2 | 11/2012 | Laurie et al. |
| 9,059,858 B1* | 6/2015 | Giardina ............... H04L 9/3226 |
| 9,530,050 B1* | 12/2016 | Erol ....................... G06F 17/241 |
| 2006/0171538 A1 | 8/2006 | Larson et al. |
| 2008/0028455 A1 | 1/2008 | Hatter et al. |
| 2008/0209516 A1 | 8/2008 | Nassiri |
| 2011/0238510 A1 | 9/2011 | Rowen et al. |
| 2012/0041885 A1 | 2/2012 | Parker |
| 2013/0185565 A1* | 7/2013 | Appelbaum ........ G06F 21/6209 713/176 |
| 2014/0280061 A1* | 9/2014 | Elkhou ............. G06F 17/30011 707/722 |
| 2015/0078665 A1* | 3/2015 | Wang ................. G06K 9/00402 382/187 |
| 2016/0132693 A1* | 5/2016 | Kumar ................ G06F 21/6245 726/28 |

OTHER PUBLICATIONS

Using MS SharePoint as a Tool for Audit Team Efficiency by Roth, dated Dec. 11, 2013.*

\* cited by examiner

CERTIFICATE OF EVIDENCE

Signing ID: 87632998003 — 39
Status: Completed

Created by: — 42        Signatory: — 43
Bob Smith               Jane Doe
User name: bsmith       janedoe@example.com
IP Address: 10.456.789

Official Seal — 53

Real Time Substantiation Events — 44
IP of Signatory Mobile IP Address:  12.543.876
        2016-01-10; 10:28:04
SMS Pin:    Sent 2016-01-14; 08:56:14 — 45
            Verified: 2016-01-14; 09:18:04
Selfie:     Captured via SignaSure mobile app
            2016-01-14; 09:24:52 — 46
Bar Code scan: Captured via SignaSure mobile
            app 2016-01-14; 09:30:12 — 47
        ID:  Driver's license — 48
Initial Location:  Via GPS, SignaSure mobile app: N 35.105552, W -106.647388
            Via IP: Albuquerque, New Mexico
Signing Location: Via GPS, SignaSure mobile app: N 35.105554, W -106.647390
            Via IP: Albuqueque, New Mexico — 49
Article creation:  2016-01-14; 8:54:52; created from Template 65821 — 50
Article emailed:   2016-01-14; 08:56:14; to janedoe@example.com from IP
10.456.789 — 51
Article opened:    2016-01-14; 09:18:04; janedoes@example.com at — 52
            IP12.543.876; N 35.105552, W -106.647388
Article review completed:    2016-10-14; 09:15:10 at IP 12.543.876 — 53
Signed:        2016-10-14; 09:21:16 at IP 12.543.876; N 35.105554, W -
            106.647390 — 54
Alert:       To 10.456.789 re article signature; 2016-10-14; 09:21:16 — 55

Signature: Jane Doe
*Jane Doe*
2016-10-14; 09:21:16

DOCUMENT SIGNING PLATFORM CAPABLE OF CAPTURING SUBSTANTIATING EVENT DATA

PRIORITY CLAIM

This application is a continuation of U.S. application Ser. No. 14/999,444, filed May 5, 2016, which claims priority to U.S. Provisional Appl. No. 62/179,479, filed May 8, 2015, and U.S. Provisional Appl. No. 62/389,570, filed Mar. 2, 2016.

BACKGROUND

This invention relates to data transmission systems. Further, the invention relates to systems to substantiate/authenticate an electronic signature. Still further, the invention relates to systems inextricably linked to computers and digital transmission systems.

Those of skill in the art have long endeavored to provide improved data transmission and signature substantiation systems. Accordingly, it would be highly desirable to improve upon existing systems. Therefore, it is a principal object of the invention to provide an improved digital transmission and electronic signature system.

BRIEF DESCRIPTION OF THE DRAWINGS

This and other objects of the invention will be apparent from the following detailed description thereof, taken in conjunction with the drawings, in which:

FIG. 9 is a diagram illustrating a certificate of evidence generated by a digital transmission system constructed in accordance with the invention.

DETAILED DESCRIPTION

The present invention includes a document signing platform implemented on one or more computers, such as a network-accessible server. The document signing platform is capable of recording, in connection with the execution of a document, one or more substantiating events that evidence valid document execution by a signatory.

In one embodiment, the document signing platform implements a process that comprises: receiving, from an originator computing device, a submission comprising a document to be signed by a signatory; providing the signatory electronic access to the document and to an indication of a set of one or more substantiation actions to be performed; and receiving and recording event data from a signatory device associated with the signatory. The event data includes data associated with affixation of an electronic signature to the document, and additionally includes substantiation event data representing performance of the set of one or more substantiation actions on the signatory device. The process further comprises validating completion of the set of substantiation actions based on the received event data; and generating a certificate of evidence that comprises at least some of the event data. The certificate of evidence includes identifiers of the document, a document originator, the signatory, and the set of one or more substantiation actions.

Figure 1:
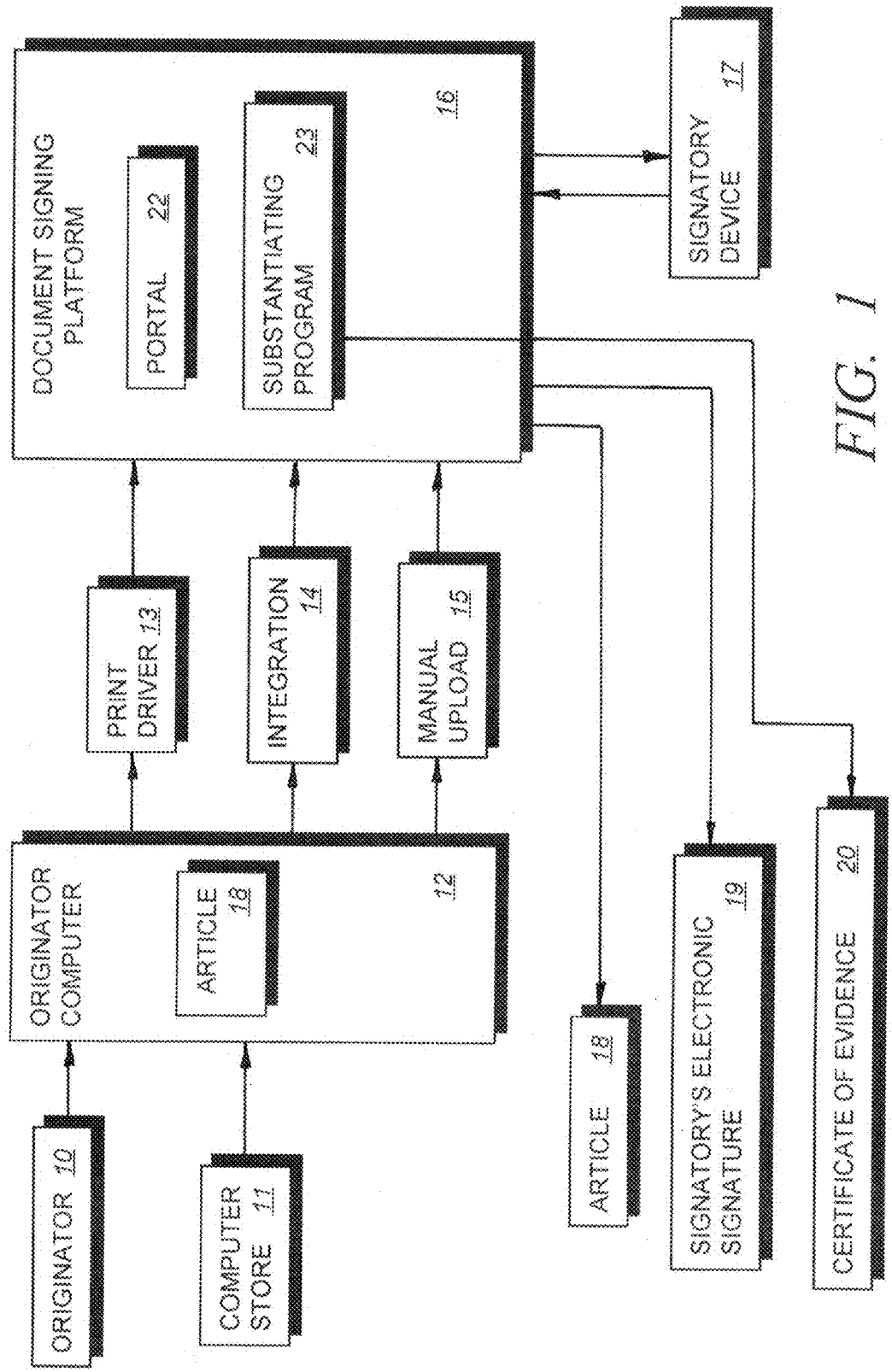
FIG. 1 is a block diagram illustrating in part a digital transmission system constructed in accordance with the invention.

Turning now to the drawings, which illustrate presently preferred embodiments of the invention by way of example, and not limitation, of the scope of the invention and in which like reference characters refer to corresponding elements throughout the several views, FIG. 1 illustrates in part a digital transmission system constructed in accordance with the invention, and including an originator computer 12 to receive and transmit an article 18 comprising data stored in an operatively associated computer store 11. Article 18 can, for example, consist of something as simple as a request for an electronic signature which enables an originator 10 to compare the electronic signature to a preexisting signature in the possession of originator 10 or can comprise a document to be reviewed and executed electronically by a signatory on a signatory device 17 in the possession of or being used by the signatory. Consequently, while article 18 can in a larger sense comprise a group of alphanumeric or other symbols requiring some action by a signatory, in the presently preferred embodiments of the invention, article 18 requires, on receipt of article 18 by the signatory, that the signatory affix an electronic signature for transmission back to a substantiating program 23 and/or the originator computer 12. By way of further example, article 18 can comprise a lease agreement and the originator can comprise the leasing agent of an apartment complex and the signatory can comprise a potential lessee, or, article 18 can comprise an offer to purchase real estate and the originator 10 can comprise a real estate agent and the signatory can comprise a potential buyer of the real estate, or, article 18 can comprise a document contracting for a trip on a ship in a cruise line and the signatory can comprise a potential traveler on the ship, etc.

Originator computer 12 transmits, when activated by originator 20, article 18 to a document signing platform 16. Platform 16 can, for example, comprise a server computer at any desired location or can comprise the originator computer 12. In the presently preferred embodiment of the invention, the document signing platform comprises a portal 22 and includes a substantiating program 23. The substantiating program 23 functions to receive from signatory device 17 and originator computer 12 and any other desired source events used to substantiate an electronic signature by a signatory. The events typically include a date and time and are used by substantiating program 23 to prepare a certificate of evidence 20 which substantiates an electronic signature made on signatory device 17 by a signatory.

Article 18 can be uploaded, or transmitted, to document signing platform 16 by any desired means. One way to upload article 18 is to use a system in originator computer 12 that ordinarily is used to transmit for printing a document to a particular printer. For example, originator computer system might utilize an HP printer. The computer would use print driver 13 to generate a "print to HP" signal that ordinarily would cause a document to be sent to the printer. This same signal 13 can be used so the print document signal causes article 18 to be transmitted electronically via the Internet or any other communication channel to the document signing platform 16. Integration 14 or manual uploading techniques 15 can also be utilized. Once article 18 is received by document signing platform 16, article 18 can be accessed and downloaded by signatory device 17. In another embodiment of the invention, article 18 is, on receipt by document signing platform 16 immediately transmitted to signatory device 17. In a further embodiment of the invention, article 18 is emailed to signatory device 17 by originator 10 via originator computer 12. In still another embodiment of the invention, article 18 is given to the signatory on a thumb drive which can be used to download article 18 onto signatory device 17. In still a further embodiment of the invention, signatory device 17 accesses article 18 via a provided web link. Importantly, however, the presently preferred embodiments of the invention are inextricably linked to computers and electronic transmission systems which permit data to be immediately transmitted real time by a device (i.e., originator 12, document signing platform 16, and signatory device 17). The immediate real time transmission of an event is believed critical in the practice of the invention because it permits continual efficient up-to-date monitoring of the process for substantiating an electronic signature made on a signatory device, and, importantly, because it minimizes the risk of data manipulation on a signatory device 17. If events are simply stored on signatory device 17 and then later transmitted as a file comprising data defining a collected group of events, the manipulation of data in the file is more readily achieved. If instead an event is immediately transmitted to substantiating program 23 real time, such manipulation is significantly more difficult to achieve. Accordingly, immediate real time transmission of data defining an event helps to substantiate with a high degree of confidence that an electronic signature has been made by a signatory.

Figure 2:
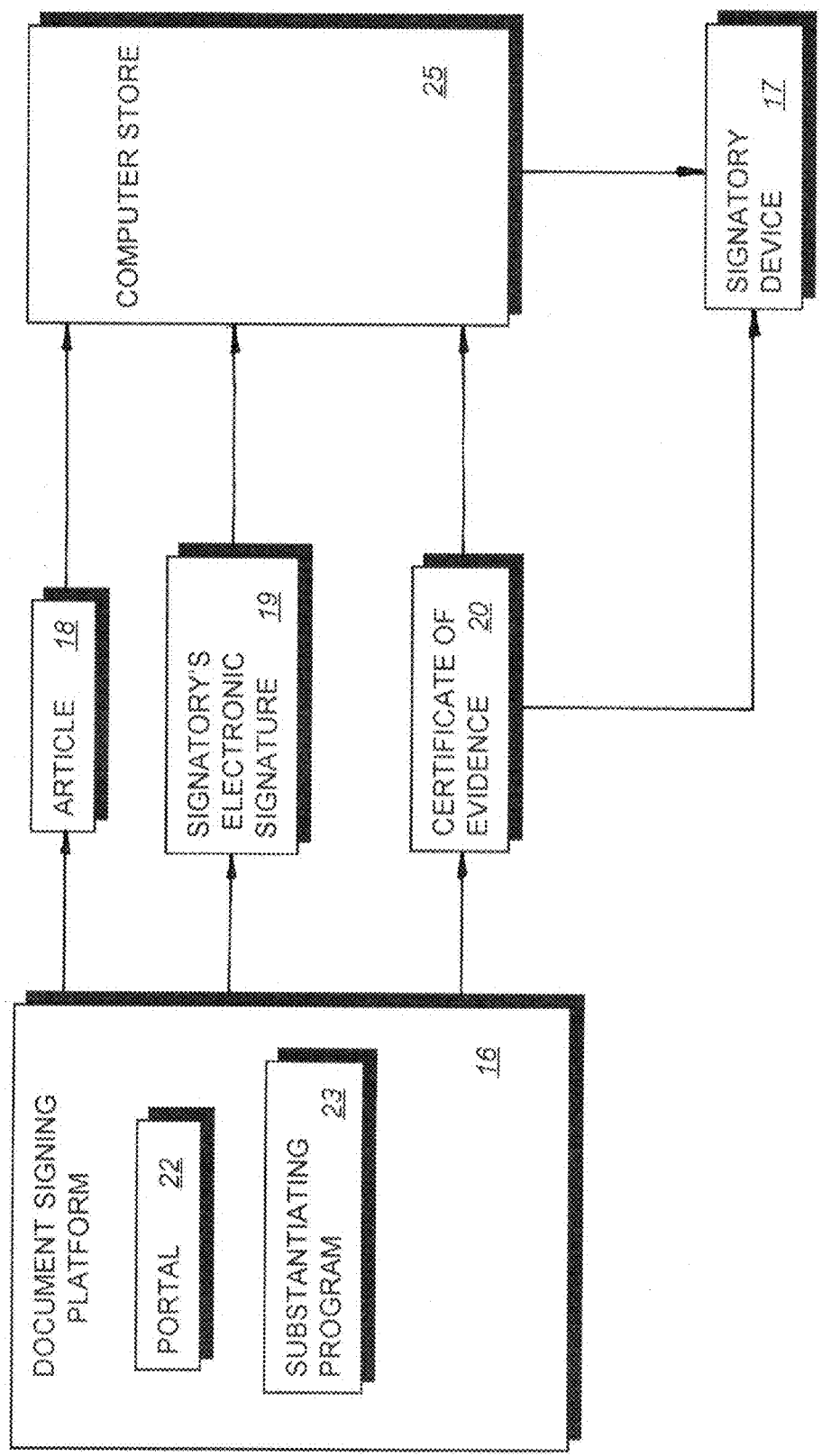
FIG. 2 is a block diagram further illustrating the digital transmission system of FIG. 1.

As can be seen in FIGS. 1 and 2, the substantiating program 23 also can retain article 18 and a signatory's electronic signature 19 for later transmission—along with a certificate of evidence—to a computer store 25. The certificate of evidence can also, as indicated in FIG. 2, be digitally electronically transmitted to signatory device 17 via computer store 25 or by any other desired means.

In one important embodiment of the invention, the signatory device 17 comprises a mobile device 17A which is carried on the person and transported from one geographical location to another geographical location. A mobile device 17A does not comprise a desk top computer or other fixed computer, but instead consists of, for example, an iPhone, iPad, or laptop computer, i.e., mobile device 17A is relatively small and typically is readily carried on the person from one location to another. Mobile device 17A includes a computer, typically a microprocessor, and an associated memory and ordinarily uses electronic transmission systems to receive and transmit data digitally from a plurality of different geographical locations. It is, of course, possible for a mobile signatory device 17A to be connected by cable to an originator computer 12 or document signing platform 16, but such a connector normally is impractical and unlikely in the practice of the invention. The invention is, particularly with respect to a mobile signatory device which is continually transported to a variety of disparate remote geographical locations, inextricably tied to digital transmission systems and to the ability to transmit immediately real time data from a variety of different geographical locations.

Figure 3:
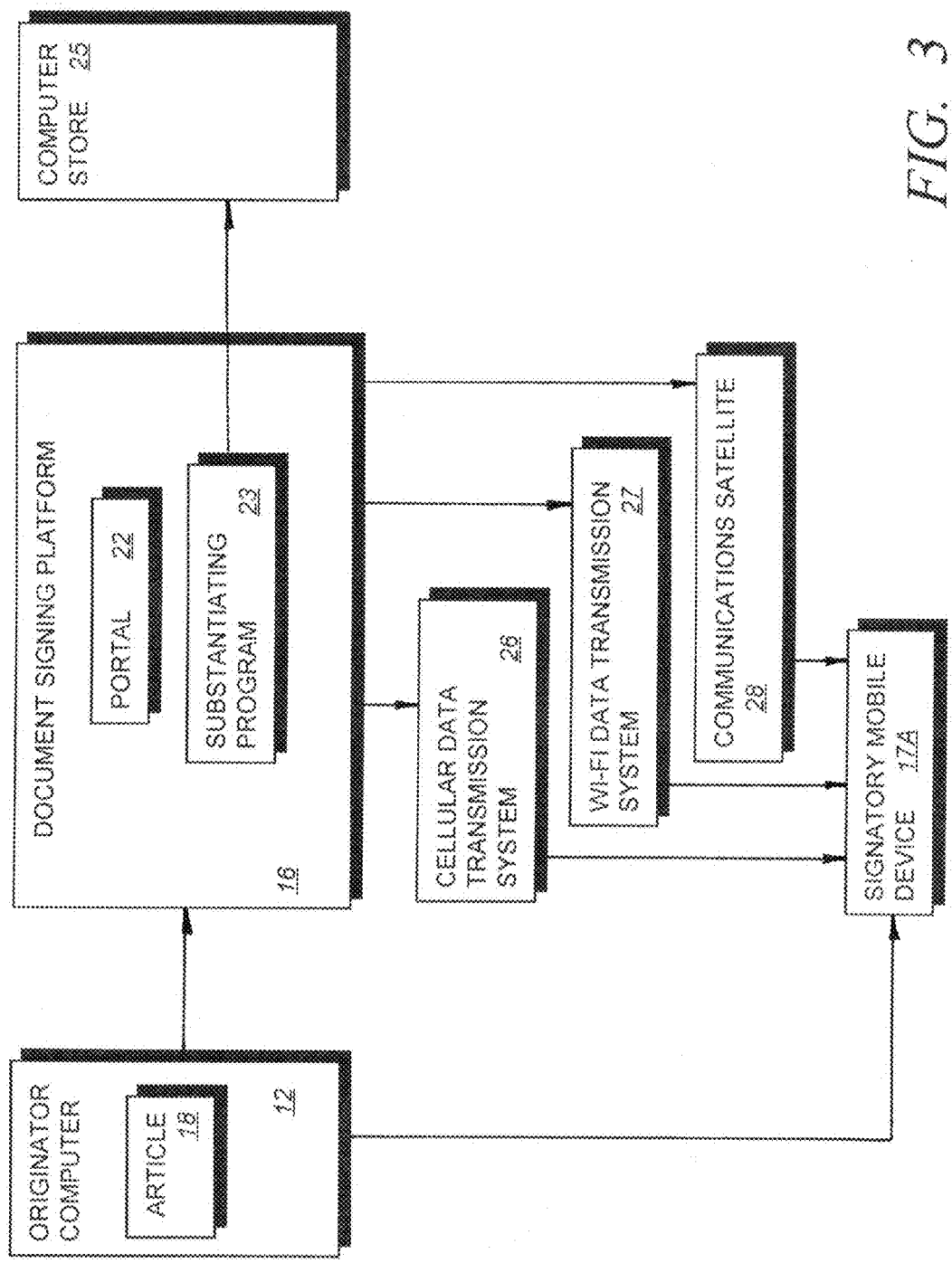
FIG. 3 is a block diagram illustrating digital transmission avenues available in conjunction with transmitting data to a mobile signatory device.
Figure 4:
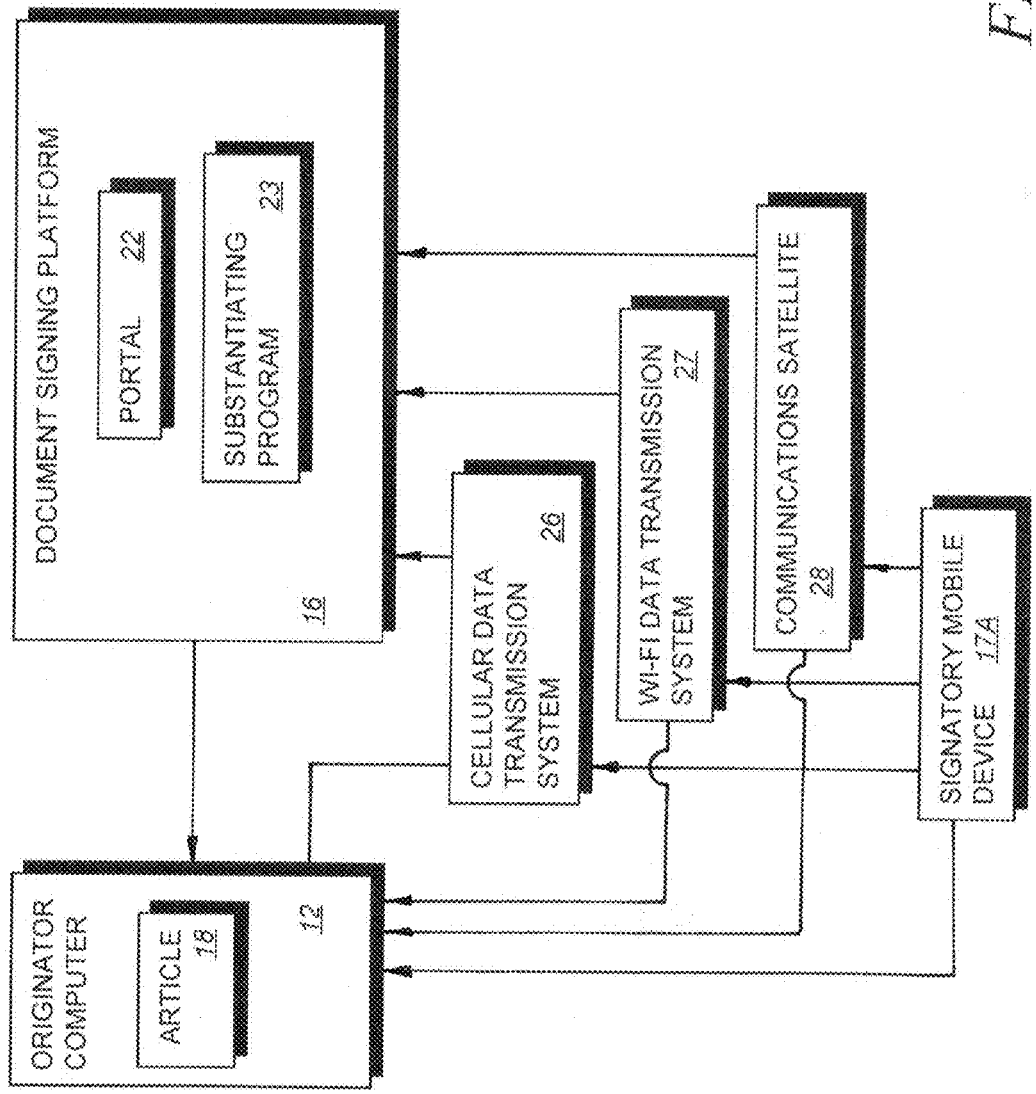
FIG. 4 is a block diagram illustrating digital transmission avenues available in conjunction with the transmission of data from a mobile signatory device.

As shown In FIG. 3, data typically is transmitted from an originator computer 12, from document signing platform 16, or from some other desired source via a cellular data transmission system 26, a wi-fi data transmission system 27, or a communications satellite 28 which communicates with signatory mobile device 17A (or communicates with a fixed signatory device). Similarly, as shown in FIG. 4, data is transmitted to originator computer 12, document signing platform 16, or another desired receiving station via systems 26 and 27 or satellite 28.

Figure 5:
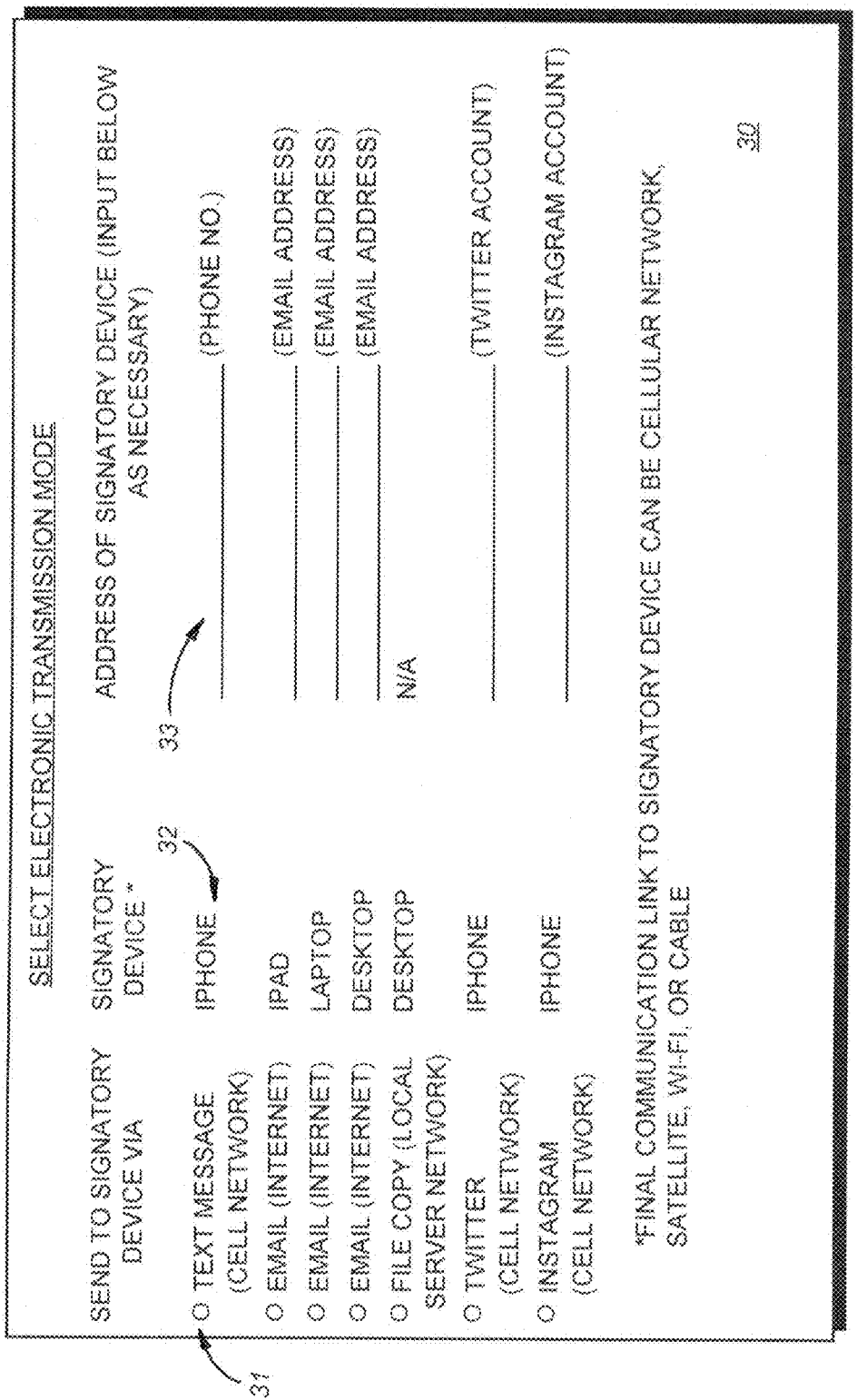
FIG. 5 is a diagram illustrating selectable electronic transmission modes available to an originator in accordance with the invention.
Figure 6:
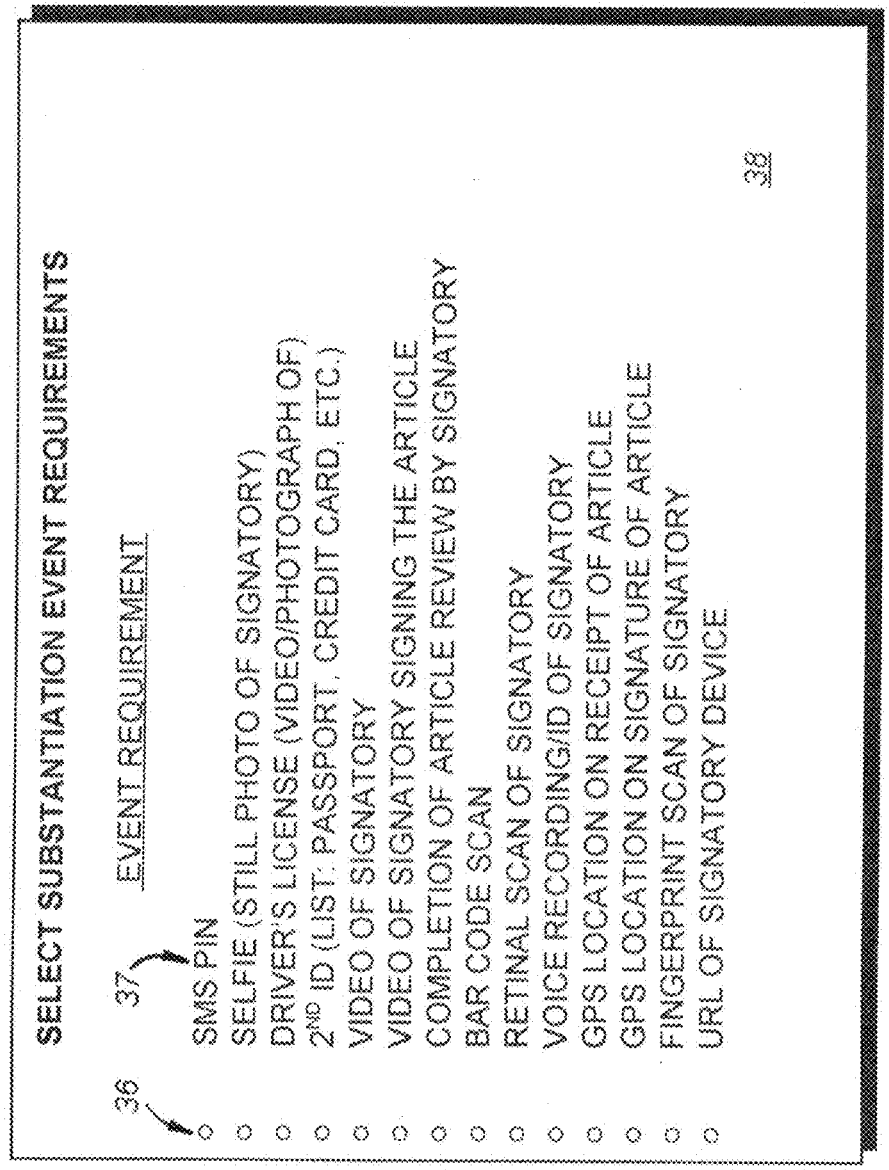
FIG. 6 is a diagram illustrating selectable substantiation events available to an originator in accordance with the invention.

As is illustrated by the menu shown in FIG. 5, originator 10 can select any of a variety of transmission modes 30 to forward article 18 to a signatory device 17 or 17A, to document signing platform 16, or to any other desired receiving station or device. For example, if in FIG. 5 the originator 10 desired to forward by text message an article 18 to a signatory device 17A comprising an iPhone 32, originator 10 can use his computer mouse or mouse pad or other means to click on (i.e., to select) the circle 31 adjacent the words "text message" and enter with his computer keyboard on line 33 the phone number of the iPhone comprising signatory device 17A.

Prior to forwarding an article 18 to a signatory device 17, 17A for review and signature by a signatory, originator 10 can select any of a variety of substantiation events which must, in addition to affixing an electronic signature to an article 18, be carried out by a signatory to complete review of article 18. Each desired substantiation event is, for example, selected by using a mouse or mouse pad or other means to click on (i.e., to select) a circle 36 adjacent a desired 37 event requirement. The signatory is, along with article 18 or at some desired point in time, provided with a list of the substantiation events which must be performed by the signatory.

Figure 7:
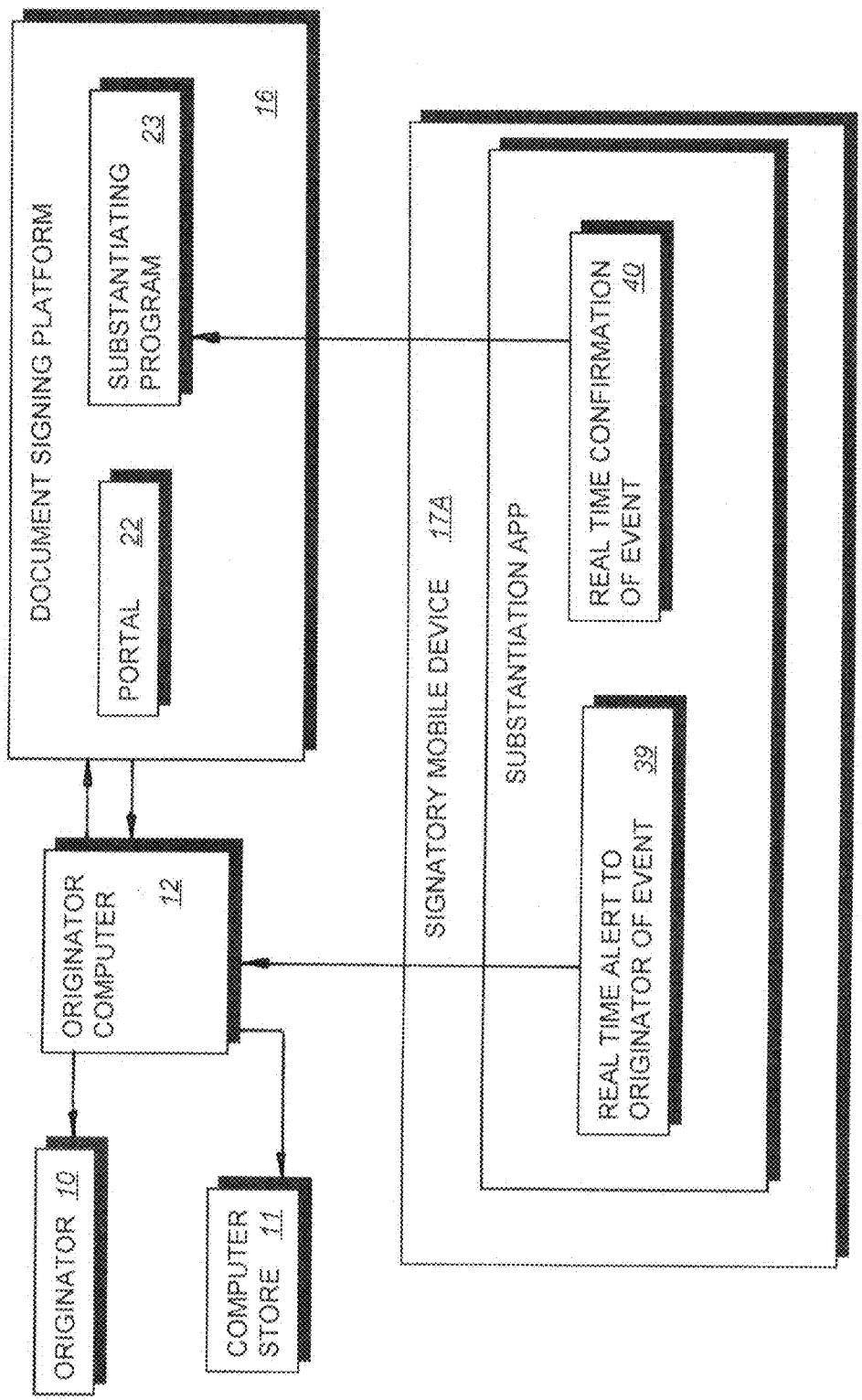
FIG. 7 is a block diagram illustrating the digital transmission of real time confirmations and alerts from a signatory mobile device.

FIG. 7 illustrates the real time transmission of confirmation 40 of an event to substantiating program 23 or another desired receiving source. FIG. 7 also illustrates the real time transmission of an alert 39 to originator computer 12. As used herein, real time indicates that data is processed by a computer within milliseconds so that it is available virtually immediately as feedback.

Figure 8:
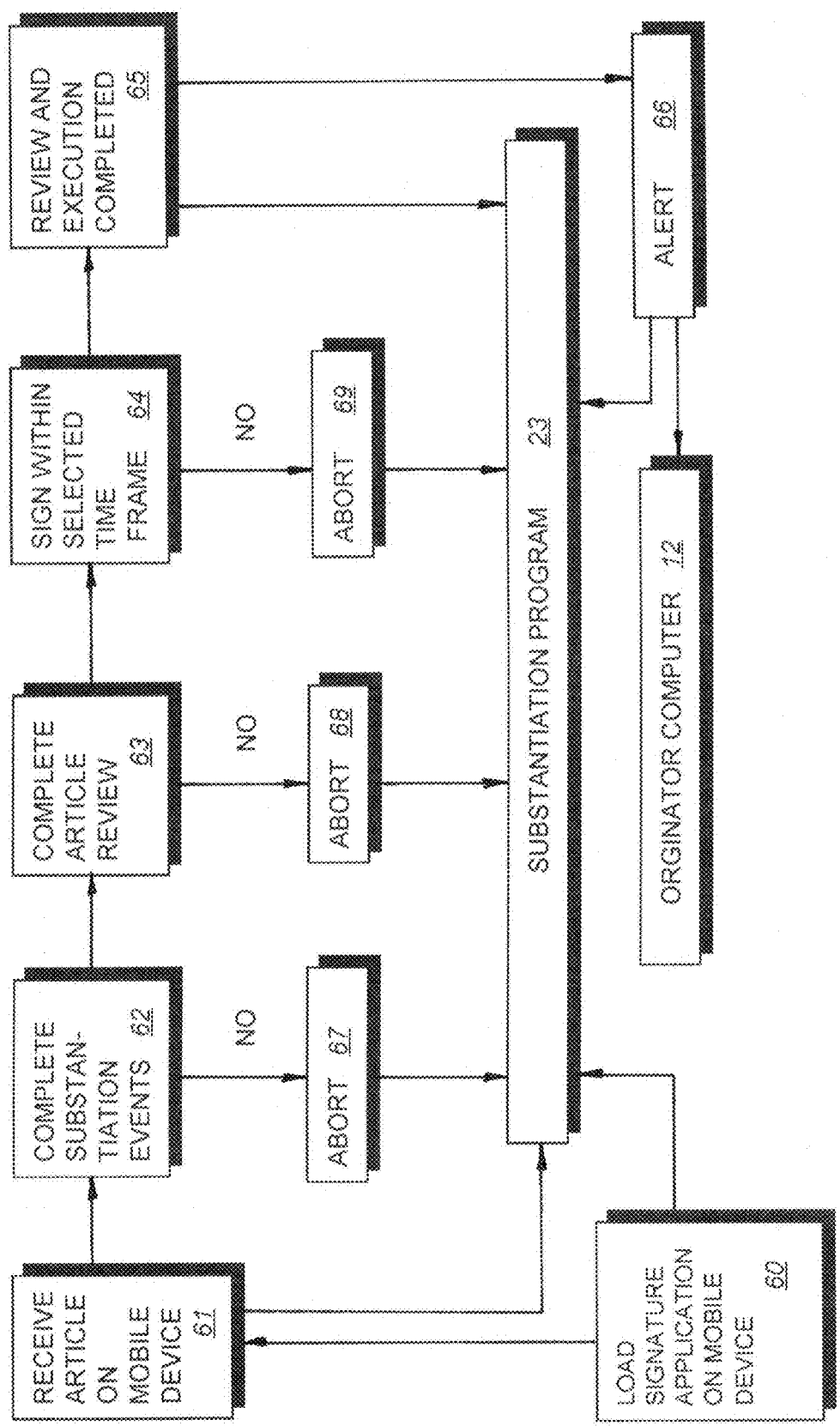
FIG. 8 is a block diagram illustrating one procedure followed by a signatory in reviewing and signing an article transmitted to the signatory.

FIG. 8 illustrates a process which can be followed by originator 10 and by a signatory in accordance with one embodiment of the invention. A signature application (i.e., an "app") is loaded 60 on a signatory mobile device 17A. The signature app facilitates the completion and real time confirmation of various substantiating events that are required by originator 10. In other embodiments of the invention, the mobile signatory device 17A or other signatory device 17 need not load and utilize an app, but can simply access a portal 22 or other desired source and use in conjunction with portal 22 pre-existing features available on the signatory device 17, 17A.

Originator 10 creates article 18. Once article 18 is created, the time and date of creation are immediately automatically forwarded real time to substantiating program 23 for inclusion 50 (FIG. 9) on a certificate of evidence 20 created by program 23.

After the signature app is loaded 60 on the signatory device 17A, article 18 is transmitted to device 17A (by email for example) and is received 61 by the device 17A. The time and date of transmission by email are immediately automatically forwarded real time to substantiating program 23 for inclusion 51 (FIG. 9) on a certificate evidence 20 created by program 23. The time and date of the opening of article 18 on signatory device 17A by the signatory are immediately automatically forwarded real time to substantiating program 23 for inclusion 52 (FIG. 9) on a certificate of evidence 20 created by substantiating program 23.

The signatory must complete the substantiation events 38 selected and required by originator 10. If the signatory refuses to complete the required substantiation events and notes such by making an appropriate entry, the process for electronically signing article 18 is aborted 67 and such event is immediately automatically forwarded real time to substantiating program 23. Or, if the signatory does not complete the required substantiation events within a specified period of time, the process for electronically signing article 18 is aborted 67 and such event is immediately automatically forwarded real time to program 23. In addition to being forwarded to program 23, a real time alert typically would be forwarded to originator computer 12 to notify the originator 10 that the signing process has been aborted.

One substantiation event 38 that typically is required is for the signatory to review 63 the entire article 18, or at least to review each of designated sections (called "hotspots") of article 18, and to indicate that article 18 and any specified paragraphs or sections of article 18 have been reviewed by using a mouse, or mouse pad, or other device to check a "section reviewed" box, by typing in a desired response, etc. The signatory may not skip reviewing and confirming review of any designated sections of article 18. The time taken by a signatory to review a section or page of an article 18 can be tracked and immediately recorded by substantiation program 23. Each time the review of a section or page of article 18 is completed, the time and date of such completion can be forwarded real time to substantiation program 23. Such tracking can be accomplished at a web site at which a signatory is reviewing article 18, or can be accomplished at a signatory device 17, 17A at which a signatory is reviewing article 18. In order to indicate that review of a section of article 18 has been completed, a signatory can be required to affix an electronic signature to the section of an article 18 which has just been reviewed by the signatory. Affixing an electronic signature to sections of article 18 or otherwise making entries on article 18 to confirm review of article 18 effectively physically transforms article into a "reviewed" article format, which format can be transmitted to substantiation program 23 for storage at portal 22 or at another desired location.

Article 18 typically is reviewed by reading (and if necessary scrolling through) the article 18 on the display screen of the signatory device 17A and by making the necessary entries to confirm that each section of article 18 has been reviewed. Each time a signatory makes an entry confirming that a section of article 18 has been reviewed, the time and date of such entry and description of the section of article 18 reviewed is, as noted above, preferably immediately transmitted real time to substantiating program 23. Similarly, once article 18 has been completely reviewed, the time and date of such completion is preferably immediately transmitted real time to substantiating program 32, and, an alert may be immediately transmitted real time to originator computer 12. If the signatory fails to complete the review of article 18 within a specified period of time, or makes an entry via his computer indicating that the signatory refuses to complete the review or wants to make changes to article 18, the signing process is aborted 68 and a real time notification of such is immediately transmitted real time to program 23. An alert may also be immediately transmitted real time to originator computer 12. Completion of the review of article 18 can be included 53 on the certificate of evidence 20 (FIG. 9).

As a further example of a substantiation event which may be required, a web app may prompt a signatory to allow access to the signatory's webcam. If the signatory refuses, then the signing process is aborted 67. If the signatory permits access, then the signatory centers his or her face in front of the webcam, and clicks a button, touches a display screen to "click" a button, etc. to capture the image. The image is automatically immediately electronically transmitted and uploaded to a background server which, as defined herein, comprises part of portal 22. The image can, if desired, be attached to and comprise part of a certificate of evidence 20 (FIG. 9). The image on the certificate of evidence 20 can, if desired, comprise a thumbnail in order to minimize the size of the space on certificate of evidence 20 which is occupied by the image.

If article 18 is not electronically signed within a selected time frame 64, the signing process is aborted 69 and an immediate real time notification and alert are forwarded real time to program 23 and originator computer 12. Of note is that some substantiation events may not be completed until the time the electronic signature is affixed to article 18 by the signatory. For example, a required substantiation event may be that the signatory make a video of himself or herself affixing an electronic signature to article 18 by moving a finger over a touch screen to produce a signature. Completion of the electronic signature can be included 54 on the certificate of evidence 20, as can be the alert 55 to the originator computer 12.

Once the signing process, including affixing the signatory's electronic signature to article 18, is completed, substantiation program 23 produces a certificate of evidence 20 and forwards it, along with a copy of article 18 and a replication of the electronic signature 19, to a store computer 25 for storage thereon. The signatory, using device 17, 17A or some other computer, ordinarily can access store computer 25 to review or download these items, as can originator 10. Or, the certificate of evidence 20, electronic signature 19 and article 18 can be forwarded to signatory by any desired means including, for example, by substantiation program 23 or originator computer 12.

An example of a certificate of evidence 20 is illustrated in FIG. 9 and includes an official seal 53, an signing ID 39 identifying the transaction at hand (i.e., the article, originator 10, signatory, etc.), data 42 identifying the originator, data 43 identifying the signatory, the electronic signature 19 of the signatory, and the date and time 52 the electronic signature was affixed.

A variety of substantiation events 38 are memorialized on the certificate of evidence 20 and include the signatory's IP address 44, data 45 defining verification of an SMS pin; the date and time a selfie was captured using an app on mobile device 17A, the initial location 48 (by IP and by GPS) of the mobile device 17A, the location 49 of the mobile device when the electronic signature was affixed using device 17A, the date and time of creation 50 of article 18, the date and time 51 article 18 was emailed to device 17A; the date and time 52 article 18 was opened on device 17A and viewed by the signatory; the date and time and IP address 53 when the review of the article was completed; the date and time and location 54 at which an electronic signature was affixed to article 18 using device 17A; and, the date and time 55 an alert was sent to the originator computer (IP address 10.456.789) 12 confirming that an electronic signature was affixed to article 18.

The certificate of evidence 20, article 18, and electronic signature 19 can be stored electronically, or if desired in hard form in the form of a paper copy, or microfiches, or CD, or DVD, etc. Electronic storage can, in conventional fashion, be in the "cloud", in a secure server, etc.

As noted, document signing platform 16 permits a document to be retrieved by a signatory for signature. Platform 16 also permits originator 10 to access platform 16 to retrieve a signed or unsigned article 18, to manage (including editing) an article 18, to generate or obtain a report concerning the chain of events leading up to and including the generation of a certificate of evidence 20, and to manage various signatories or originators 10 using the substantiation system.

An important feature of the invention is that a wide variety of substantiation events can be utilized to compile a certificate of evidence 20 which substantiates the affixation of an electronic signature to an article 18. Such events include (1) article events including transmission of article 18 to mobile device or other signatory device, transmission of article 18 to computer store 25, transmission of article 18 to document signing platform 16 for storage and, if necessary, downloading, (2) location-derived events including the GPS location of signatory devices and IP addresses, (3) visual events including photographs or videos taken by a signatory or signatory device of the signatory, the signatory's fingerprint, and a retina scan of the signatory, (4) audio events including a sound recording made on the signatory device 17, 17A, (5) optical machine-readable data events including scanning and interpreting bar codes, and (6) signature events including review by a signatory of an article 18, and electronic signature by a signatory. Further, and importantly, information provided by one event often helps to confirm—or contradict—information obtained in another event. In particular, the ability to scan a bar code on a driver's license or passport or other object can help confirm information provided via another event. Information contained in the bar code on a driver's license can confirm information like height, weight, photograph, medical impairments, etc. on the driver's license as well as confirm whether the individual who is shown by a "selfie" taken by the signatory matches the description on the driver's license. An example of a common medical impairment noted on a driver's license is the requirement to wear glasses.

If desired, when article 18 is forwarded to a signatory device 17, 17A, a guided document review 34 can be provided which sets forth one or more sections of the document. This guided document review can comprise a written description of a section(s) of the document, can comprise a video of an individual setting forth a section(s) of the document, or can comprise both the written description and a the video description. The signatory ordinarily may not be required to make use of the guided document review prior to signing. However, as one of the substantiation events, the signatory can, as noted, be required to review one or more sections of the document and to verify (by, for example, checking a box confirming that the signatory read or viewed and understood the written or video description of the section(s) of the document) that the appropriate document review was completed.

A variety of procedures for electronically signing documents are known in the art and are not described herein. However, importantly, as noted earlier herein, the signatory must carry out the substantiation events specified by originator 10.

As used herein, portal 22 comprises, in conventional fashion, an Internet site, a data base system, and one or more computers or "back end servers". Data used to produce a certificate of evidence 20 is typically stored on the computers, or back end servers.

The functionality of a signatory device 17, 17A used in the practice of the invention can vary, but such devices normally have a camera and can take and store photographs, have a microphone and can record a person's voice or other sounds, can access the Internet, can receive and make telephone calls, have a clock and calendar and track time of day and date, and can load and use a variety of computer programs, or "apps". Such devices also normally can access and use social media including Facebook, Instagram, and Twitter.

In one embodiment of the invention, a signatory does not download and use an app but instead accesses with device 17, 17A portal 22 via the Internet and reviews an article 18 at a web site. The signatory utilizes a device 17, 17A to complete certain required substantiation events such as taking and transmitting to the web site a "selfie".

The invention claimed is:

1. A document signing platform comprising one or more computers programmed to implement a process that comprises:

receiving, from an originator computing device, a submission comprising a document to be signed by a signatory;

providing, to a signatory device associated with the signatory, at least (1) the document, and (2) executable event reporting code that instructs the signatory device to report to the document signing platform, substantially in real time, a plurality of events that occur on the signatory device during access to the document, the plurality of events comprising at least one document review event that occurs prior to electronic execution of the document, the at least one document review event including a pre-execution section review acknowledgement event in which the signatory acknowledges review of one of a plurality of sections of the document, the executable code thereby enabling the document signing platform to monitor a pre-execution review status of the document substantially in real time, the plurality of events additionally including an electronic document execution event in which an electronic signature is affixed to the document;

receiving, over a network, event data reported by the signatory device by execution of the event reporting code, the event data representing occurrences of the plurality of events, wherein the event data for each of the plurality of events is reported by the signatory device substantially in real time when the respective event occurs, such that different events are reported at different points in time as the document is accessed on the signatory device; and recording the reported events on the document signing platform based on the received event data, wherein recording the reported events comprises recording times of occurrence of the reported events.

2. The document signing platform of claim 1, wherein the plurality of events includes a document opening event in which the document is opened on the signatory device.

3. The document signing platform of claim 1, wherein the event data includes an image of an object that includes a bar code having encoded information about the signatory, and the process comprises extracting the encoded information from the bar code; and using the encoded information to verify an identity of the signatory.

4. The document signing platform of claim 1, wherein the process further comprises determining, based on the received event data, whether the reported occurrences of plurality of events satisfy timing criteria for validating electronic execution of the document.

5. The document signing platform of claim 1, wherein the event data comprises an IP address corresponding to the signatory device.

6. The document signing platform of claim 1, wherein the event data comprises GPS based location data specifying a location of the signatory device.

7. The document signing platform of claim 1, wherein the executable event reporting code comprises program code of a mobile application that runs on the signatory device.

8. The document signing platform of claim 1, wherein the executable event reporting code comprises code of a web portal.

9. A system for monitoring and validating electronic execution of a document, comprising:
  a document signing platform comprising one or more computers, the document signing platform configured to receive a document from an originator, and to provide a signatory electronic access over a network to the document; and
  event reporting code configured to run on a signatory device associated with the signatory, wherein the event reporting code configures the signatory device to report, over a network, to the document signing platform, a plurality of events that occur on the signatory device as the signatory accesses and electronically signs the document, the plurality of events including pre-execution events that occur prior to the signatory electronically signing the document, the pre-execution events including a pre-execution section review acknowledgement event in which the signatory acknowledges review of one of a plurality of sections of the document, wherein the event reporting code configures the signatory device to report each such event to the document signing platform when the respective event occurs;
  wherein the document signing platform is configured to maintain a record of reported occurrences of the plurality of events, including time of occurrence indicators for the respective events, and is configured to use the record to validate execution of the document.

10. The system of claim 9, wherein the plurality of events includes a document opening event in which the document is opened on the signatory device.

11. The system of claim 9, wherein the event data includes an image of an object that includes a bar code having encoded information about the signatory, and the document signing platform is configured to use the encoded information to verify an identity of the signatory.

12. The system of claim 9, wherein the document signing platform is configured to determine, based on the received event data, whether the reported plurality of events satisfy timing criteria for validating electronic execution of the document.

13. The system of claim 9, wherein the event data comprises an IP address corresponding to the signatory device.

14. The system of claim 9, wherein the event data comprises GPS based location data specifying a location of the signatory device.

15. The system of claim 9, wherein the signatory device comprises a mobile application that reports the plurality of events to the document signing platform.

16. The system of claim 9, wherein the document signing platform hosts a web portal through which the signatory device accesses the document.

\* \* \* \* \*